US006590572B1

(12) United States Patent
Hoffert et al.

(10) Patent No.: US 6,590,572 B1
(45) Date of Patent: Jul. 8, 2003

(54) SYNCHRONOUS SERIAL DISPLAY MONITOR CONTROL AND COMMUNICATIONS BUS INTERFACE

(75) Inventors: Bradley W. Hoffert, Sunnyvale, CA (US); Shawn F. Storm, Menlo Park, CA (US); Abraham E. Rindal, Dunedin, FL (US); Kenneth A. Gross, Los Altos, CA (US); Robert Stano, Sunnyvale, CA (US)

(73) Assignee: Sun Microsystems, Inc., Mountain View, CA (US)

( * ) Notice: Subject to any disclaimer, the term of this patent is extended or adjusted under 35 U.S.C. 154(b) by 0 days.

(21) Appl. No.: 09/516,334

(22) Filed: Mar. 1, 2000

Related U.S. Application Data

(63) Continuation of application No. 08/632,754, filed on Apr. 16, 1996, now Pat. No. 6,057,860, which is a continuation of application No. 08/326,664, filed on Oct. 19, 1994, now abandoned.

(51) Int. Cl.⁷ .................................................. G09G 5/00
(52) U.S. Cl. ............................ 345/213; 345/10; 345/14
(58) Field of Search .............................. 345/10, 11, 13, 345/14, 213, 501

(56) References Cited

U.S. PATENT DOCUMENTS

| 5,457,473 | A | * | 10/1995 | Arai et al. ..................... 345/10 |
| 5,483,260 | A | * | 1/1996 | Parks et al. .................. 345/156 |
| 5,550,556 | A | * | 8/1996 | Wu et al. ....................... 345/14 |
| 5,565,897 | A | * | 10/1996 | Kikinis et al. ............... 345/213 |

* cited by examiner

Primary Examiner—Matthew Luu
(74) Attorney, Agent, or Firm—Blakely Sokoloff Taylor & Zafman

(57) ABSTRACT

A monitor interface cable for transmitting display data and command data between a computer system and a display monitor preferably including a microcontroller. The monitor interface cable enables both display and command data to be transmitted simultaneously from the computer system to the display monitor.

12 Claims, 7 Drawing Sheets

SYNCHRONOUS SERIAL DISPLAY MONITOR CONTROL AND COMMUNICATIONS BUS INTERFACE

CROSS-REFERENCE TO RELATED APPLICATIONS

This is a continuation of U.S. Patent Application entitled "Synchronous Serial Display Monitor Control & Communications Bus Interface" (application Ser. No. 08/632,754), filed Apr. 16, 1996, which has issued to U.S. Pat. No. 6,057,860, which is a continuation of U.S. patent application Ser. No. 08/326,664, filed Oct. 19, 1994, now abandoned.

BACKGROUND OF THE INVENTION

1. Field of the Invention

The described invention relates generally to the field of computer systems. More particularly, this described invention relates to a high speed display system that allows command and display data to be transmitted between the display monitor and a computer system through a single cable.

2. Description of Art Related to the Invention

In recent years, integrated circuit microcontrollers have become less expensive, thereby increasing their use in a variety of systems including display monitors used in conjunction with computer systems. A microcontroller, placed in such a display monitor, generally controls various parameters of the display monitor (e.g., power, brightness, screen configuration, etc.) through command data. The command data for controlling the microcontroller is usually generated by software stored external to the display monitor such as within a computer system.

One method for transferring command data to a microcontroller employed within a display monitor includes the use of a control data cable coupling the display monitor and the computer system. The control data cable enables command data to be transmitted under a standard asynchronous serial communication method from the computer system to the display monitor. As a result, various software programs running on the computer system may be used to automatically configure the display monitor through the transmission of certain commands. Thus, unnecessary costs associated with mechanical controls (knobs, switches and the like) may be eliminated.

In conventional computer systems, in addition to the control data cable, a display data cable is coupled between the computer system and the display monitor in order to transfer display data. The display monitor uses the display data to generate an image on a display screen. Utilizing both a control data cable and a display data cable, however, has a number of disadvantages.

One disadvantage is that multiple cables increase the overall cost of the computer system by requiring more connections and additional components. Moreover, it is often necessary to install an extra serial communication card in the computer system so that it may transmit the commands to the display monitor, thereby causing further costs to be incurred.

Another disadvantage is that multiple cables provide difficulties in controlling EMI radiation, contrary to a single cable implementation whereby EMI radiation can be controlled quite easily and inexpensively. In addition, multiple cables complicate the set-up of the computer system and cause unwanted clutter surrounding the computer system. Based on the foregoing and any other disadvantages, it is desirable to have a method and apparatus for interfacing a computer system to a display monitor that transmits both command data and display data through a single monitor interface cable.

BRIEF SUMMARY OF THE INVENTION

A method and apparatus for transmitting display data and command data between a computer system and a display monitor having a microcontroller is described. A monitor interface cable is provided in which both display and command data are transmitted simultaneously from the computer system to the display monitor. Inside the computer system, command data written to a particular memory location within a video buffer card is applied to various signal lines located in the monitor interface cable. These signal lines are coupled to the microcontroller, located in the display monitor, which receives the command data and performs various controlling functions in response. Status information is transmitted back across a second signal line to the computer system where various software programs including drivers receive and process the status information. Display data is simultaneously transmitted with the command data over other signal lines located in the monitor interface cable enabling the display monitor to show various images on a display screen.

BRIEF DESCRIPTION OF THE DRAWINGS

The objects, features and advantages of the present invention will become apparent from the following detailed description of the present invention in which.

DETAILED DESCRIPTION OF THE INVENTION

The present invention describes a monitor interface cable and its associated communications protocol which collectively enable transmission of command and display data to a display monitor through a single cable. Although, numerous specific details of the monitor interface cable and the protocol communications are set forth, it is obvious that these details are not required to practice the invention. In other instances, well known circuits, devices and the like may not be discussed to avoid obscuring the present invention. Moreover, two specific example has been created for the sole purpose of illustrating the protocol of the present invention. These specific examples lend themselves to explaining and distinguishes the present invention, but is in no way a limitation on the scope of the present invention.

In the detailed description, a number of terms are frequently used to describe and represent characteristics of inputs described herein. With respect to signal representations, a term "high" is representative of and interpreted by integrated circuit gates and other electronic logic as a logic level "1" having a voltage normally between 3–5 Volts, inclusive. Similarly the term "low" is representative of and interpreted by integrated circuit gates as a logic level "0" having a voltage normally between 0–2 Volts, inclusive.

Figure 1:
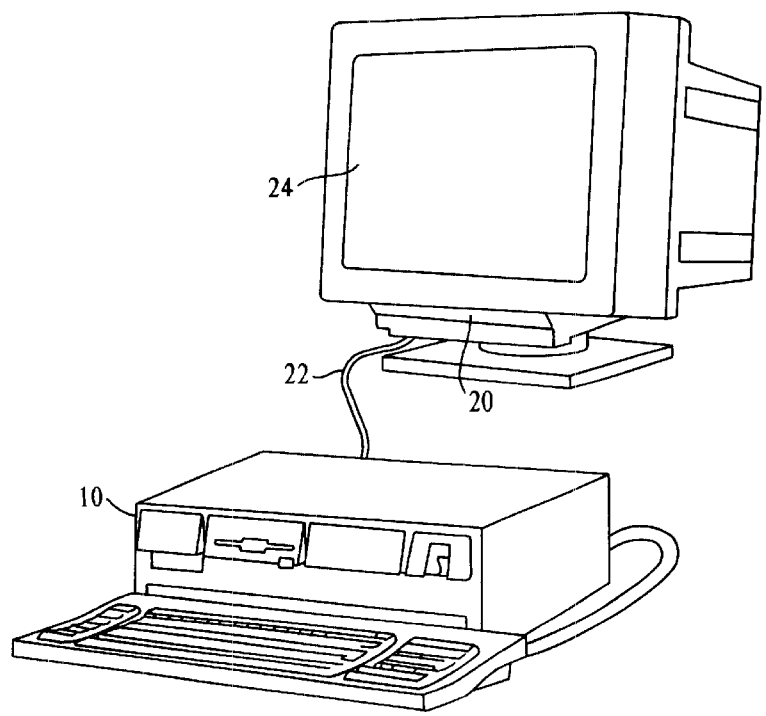
FIG. 1 is an illustration of a computer system coupled to a display monitor via a monitor interface cable.

Referring to FIG. 1, an illustrative embodiment of a computer system 10 and a display monitor 20 coupled together through a monitor interface cable 22 is shown. The computer system 10 generates and transmits display data through the monitor interface cable 22 in order to produce images on a display area 24 of the display monitor 20. Additionally, the computer system 10 generates and transmits command data transmitted through monitor interface cable 22 and intercepted by a microcontroller (not shown) located inside the display monitor 20. The command data causes the microcontroller to alter various parameters of the display monitor 20, including brightness and screen configurations, as well as power in turning the display monitor 20 "on" and "off". Additionally, the microcontroller inside the display monitor 20 provides status information which is transmitted through the monitor interface cable 22 back to computer system 10 in response to certain commands from the computer system 10.

Figure 2:
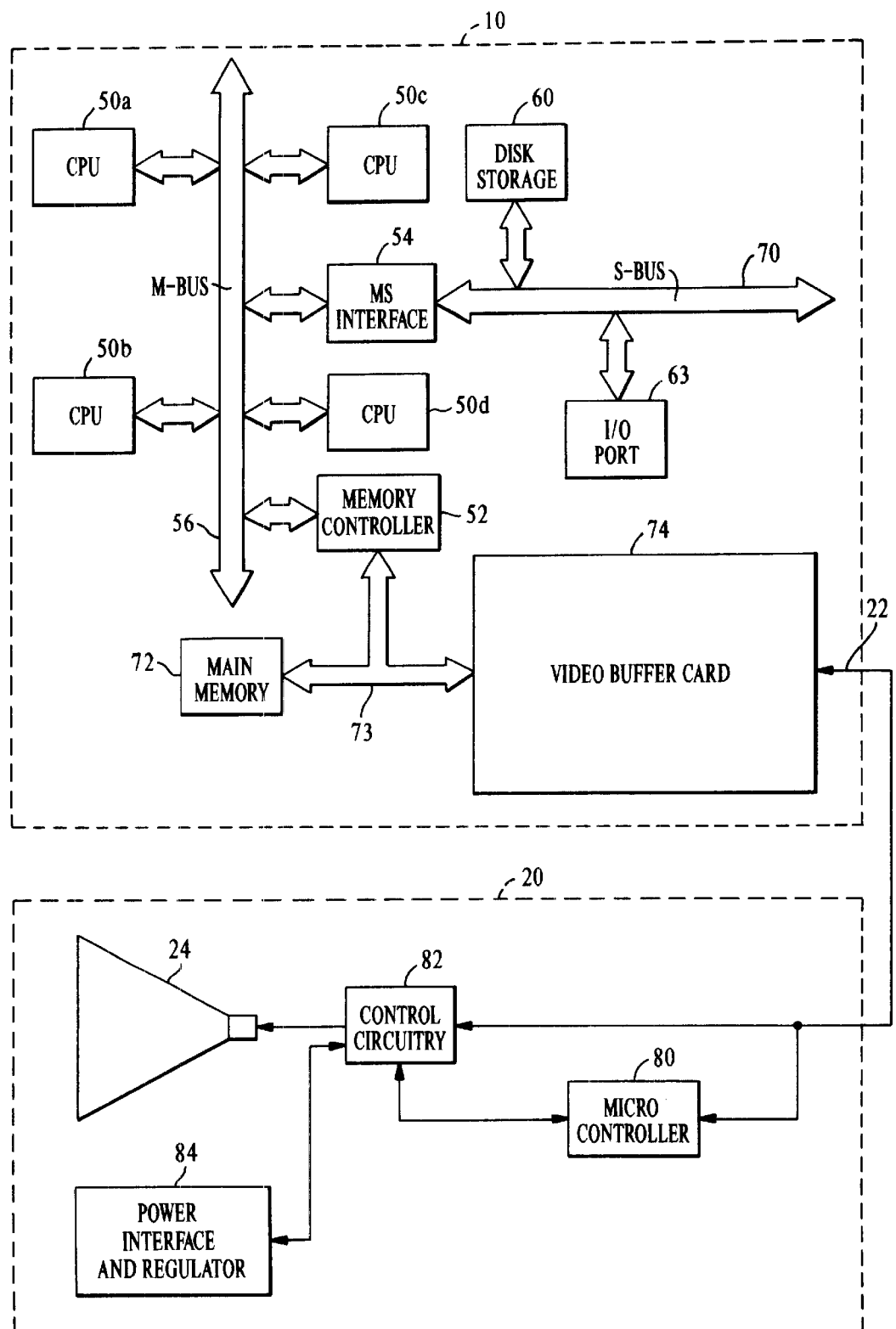
FIG. 2 is a block diagram illustrating an embodiment of the internal circuitry of the computer system and display monitor coupled together by the monitor interface cable.

Referring now to FIG. 2, an illustrative embodiment of the various circuits and systems that comprise the computer system 10 and display monitor 20 of FIG. 1 are shown. The computer system 10 comprises at least one (preferably multiple) central processor units ("CPU") 50a–50d, a memory controller 52 and an M-bus-to-S-bus ("MS") Interface 54, all of which are coupled to a memory bus ("M-bus") 56. A disk storage device 60 and at least one I/O port 63 are coupled to a system bus ("S-bus") 70 which, in turn, is coupled to the MS Interface 54. The memory controller 52 acts as an interface between the M-bus 56 and a bus 73 coupling main memory 72 and video buffer card 74. The monitor interface cable 22 couples the video buffer card 74 to a microcontroller 80 and control circuitry 82 located within the display monitor 20 to establish bi-directional communication between the computer system 10 and the display monitor 20. Within the display monitor 20, the control circuitry 82 controls a display device 24 such as a cathode ray tube ("CRT") and is coupled to a power interface and regulator 84 to receive power therefrom. It is contemplated that the display device may include flat panel displays and any other displays well known in the art. Peripheral devices such as a keyboard or a cursor control device (e.g., mouse, trackball, touchpad) are coupled to the I/O port 63.

During operation, one of the CPUs 50a–50d, for example CPU 50a, loads and executes program instruction sequences of a specific program loaded in main memory 72 or from software loaded in the disk storage device 60 and subsequently placed in main memory 72. The CPU 50a writes data for display purposes ("pre-video display data"), such as cursor control information, into the video buffer card 74 via the memory controller 52. In response to this pre-video display data, the video buffer card 74 transmits both display data and command data over the monitor interface cable 22 to the control circuitry 82 and the microcontroller 80 located inside display monitor 20. The command data enables the microcontroller 80 to configure the control circuitry 82 and power interface and regulator 84 to properly display a video image, and to provide status information back to the video buffer card 74 through the monitor interface cable 22. The display data, however, enables the control circuitry 82 to display the video image on the display device 24.

Figure 3:
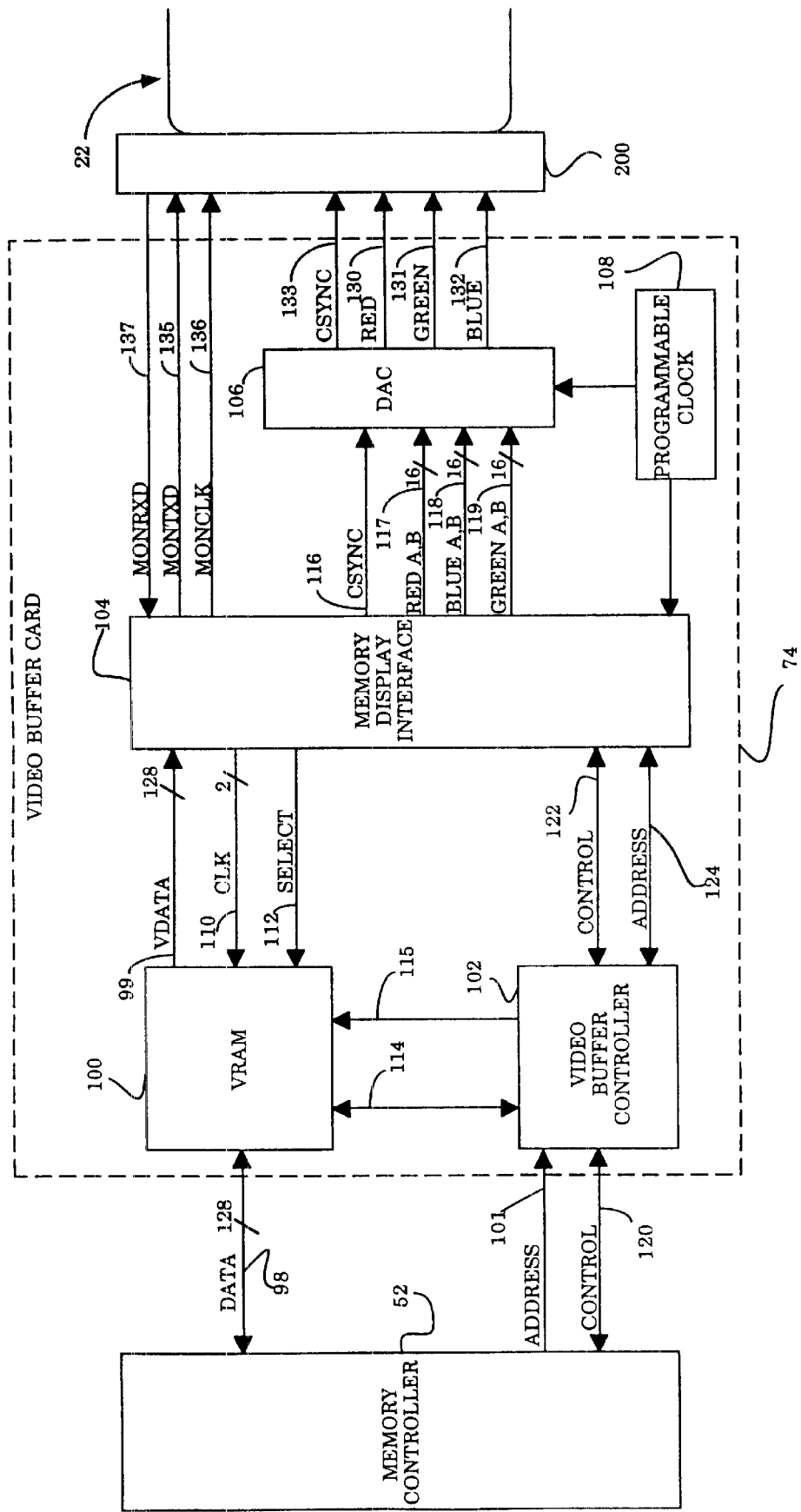
FIG. 3 is a more detailed block diagram of a video frame buffer card of FIG. 2 configured to receive data, control data and address information via the memory controller and to transmit command data and display data through various transmission lines of the monitor interface cable.

Referring now to FIG. 3, an illustrative embodiment of the video buffer card 74 of FIG. 2 coupled between the monitor interface cable 22 and the memory controller 52 is shown. As illustrated in FIG. 3, the video buffer card 74 comprises a video random access memory ("VRAM") 100, a video buffer controller 102, a memory display interface 104, a digital-to-analog converter ("DAC") 106 and a programmable clock 108. The main memory, being controlled by the memory controller 52, provides pre-video display data to the VRAM 100 over a 128-bit wide data bus 98. Configured into two banks or buffers (not shown), the VRAM 100 is coupled to the video buffer controller 102 through video control data lines 114 and video address lines 115 which enable the video buffer controller 102 to perform various control operations on the VRAM 100 including refresh.

The video buffer controller 102 receives address and control information from the memory controller 52 through signal lines 101 and 120, respectively. The video buffer controller 102 uses this address information for addressing main memory (see FIG. 2) and uses this control data for performing control operations to VRAM 100 as discussed above. The video buffer controller 102 further provides control and address information to the memory display interface 104 via control and address lines 122 and 124.

The memory display interface 104 receives video display data ("VDATA") from the VRAM 100 over a bit-wide video data bus 99 (preferably 128-bits in width) and generates a combined horizontal and vertical synchronization ("Csync") signal along bus line 116 and color display data corresponding to red, green and blue ("RGB") values for a particular pixel location via color output lines 117, 118 and 119. The color display data for each color comprises a first set "A" and a second set "B", each set having 8 bits of data for a total of 48 data signals. Thus, each set (A and B) of color data signals comprises a total of 24 bits.

These color display signals are input into a digital-to-analog converter ("DAC") 106, clocked by a programmable clocking circuit 108 of preferably 216 MHz, which generates three sets of voltage levels corresponding to these red, green and blue signals, respectively. Moreover, the DAC 106 delays the Csync signal for providing the display monitor with accurate timing for placement of RGB data on the display screen for viewing. The delayed Csync signal and the RGB data are transmitted through corresponding transmission lines 130–133. These voltage levels and the Csync signal primarily form the display data which is transmitted into a video connector 200 of the monitor interface cable 22 for later input into the display monitor.

Figure 4:
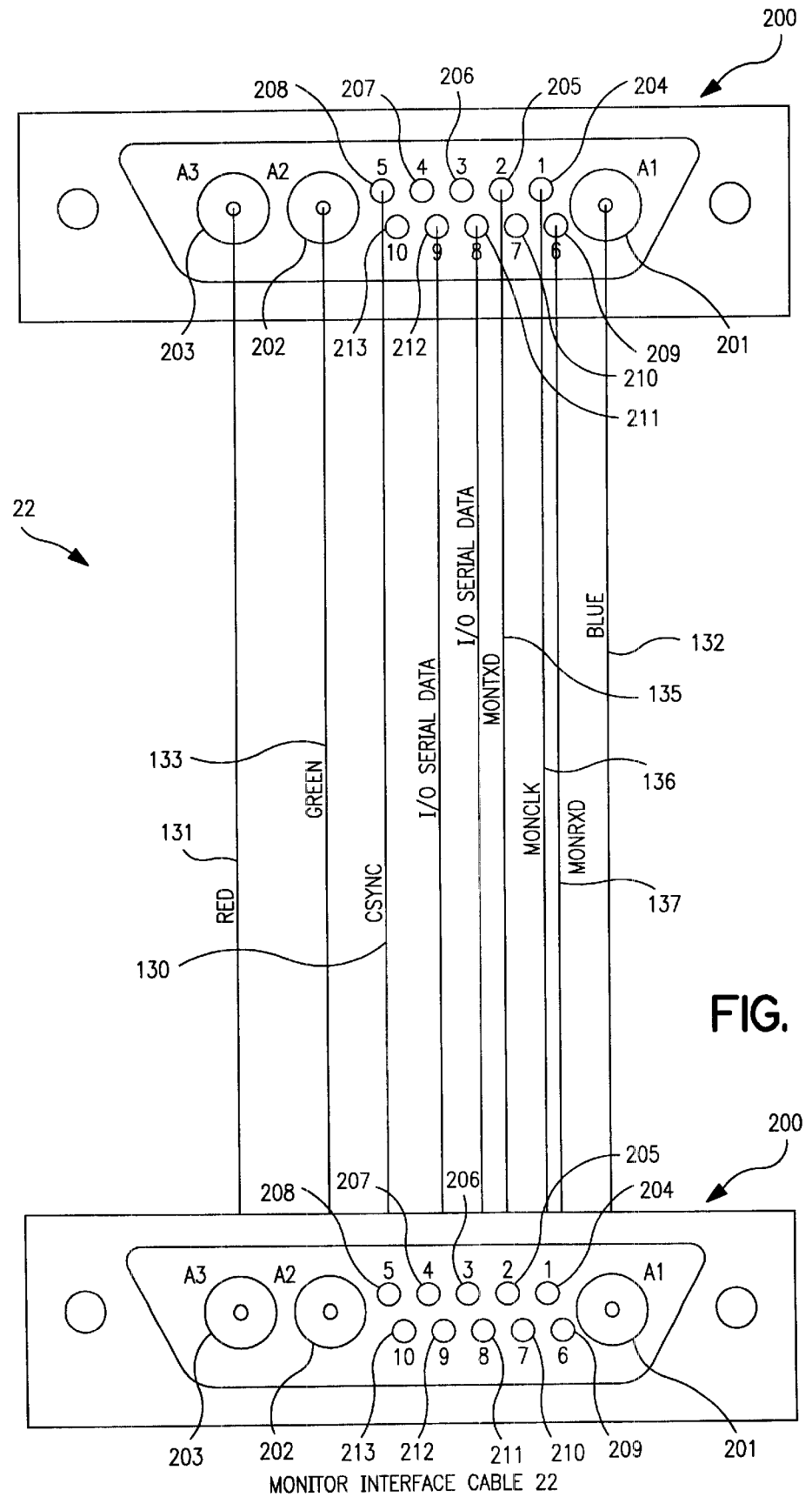
FIG. 4 is a perspective view of a cable connector employed at either end of the monitor interface cable being used to couple the computer system to the display monitor.

Additionally, the memory display interface 104 receives control information from the video buffer controller 102 through control line(s) 122. The memory display interface 104 generates and transmits command data over a monitor transmission ("MONTXD") line 135 and drives a clock signal, having a time period of preferably 50 micro-seconds ("μs"), through a monitor clocking ("MONCLK") line 136. These transmission lines 135 and 136, included in the monitor interface cable 22 as discussed with reference to FIG. 4, provide commands and its corresponding clocking signals to the display monitor 20 in response to the control information.

During operation, the memory display interface 104 transmits a clocking signal and a buffer selection signal to VRAM 100 via a clock ("CLK") and a buffer selection ("SELECT") signal lines 110 and 112. These signals enable video data to be transmitted in a predetermined order from a first of two buffers in VRAM 100 to the memory display interface 104. This video data is used by the memory display interface 104 to generate the first and second sets of display data signals provided to the DAC 106 as discussed herein and in U.S. Patent Application entitled "High Speed Display System Having Cursor Multiplexing Scheme" incorporated herein by reference.

Concurrently, the video buffer controller 102 updates the buffer in VRAM 100 with new processed data written into main memory by one of the CPUs 50a–50d (see FIG. 2) through the memory controller 52. Once a complete frame of data has been transmitted from VRAM 100 and into the memory display interface 104, the buffer selection signal 112 now selects the second buffer of VRAM 100 to be clocked into the memory display interface 104. During this time, the video buffer controller 102 updates the first buffer of VRAM 100 using data provided by one of the CPUs 50a–50d.

As previously alluded to above, the memory display interface 104 receives control information such as cursor control information and command data from the video buffer controller 102 via data lines 122. Based on this control data, the memory display interface 104 generates command data and transmits the command data to the display monitor 20 over the MONTXD line 135. The address propagating over address lines 124 programmability selects those register(s) that drive(s) MONTXD and MONCLK lines 135 and 136 and that read(s) a monitor receive ("MONRXD") line 137. It is further noted that command data, transmitted through the MONRXD line 137 from the display monitor to the computer system, is subsequently transmitted through the data lines 122 through the video buffer controller 102 and into the memory controller 52 for use as status information.

Referring to FIG. 4, a prospective view of the video connector 200 employed at the ends of monitor interface cable 22 pursuant to the illustrative embodiment of FIG. 3 is shown. The video connector 200 is a standard 13W3 cable connector, well known in the industry. Contacts A1, A2 and A3 201–203 are coaxial connectors which carry display data corresponding to red, green and blue voltage levels output from the video buffer card, respectively. A fifth contact 208 provides the Csync signal over a TTL voltage level twisted pair. An eighth and ninth contacts 212 and 213 are serial data output/input connectors coupled to a fourth contact 207 through 100 Ohm resistors. A tenth contact 213 is a return ground pin for the Csync signal of the fifth contact 208. A first contact 204 transmits the clock signal from the MONCLK output of video buffer card for synchronizing the serial data transmissions from a sixth and second contacts 209 and 205. The second contact 205 transmits serial command data from the MONTXD output of video buffer card synchronized with the MONCLK signal to the microcontroller within the display system. The sixth contact 209 is coupled to the MONRXD input to receive serial data synchronized with the MONCLK signal sent from the display monitor 20 as well as provides a vertical Sync signal when the computer system 10 is coupled to older model display monitors. The fourth contact 207 is a ground return for the signals on the MONCLK, MONTXD and MONRXD lines (hereinafter referred to as MONCLK, MONTXD and MONRXD signals) applied to the first, second and sixth contacts 204, 205 and 209. It is contemplated that a third and seventh contacts 206 and 210 may be left unconnected.

Figure 5:
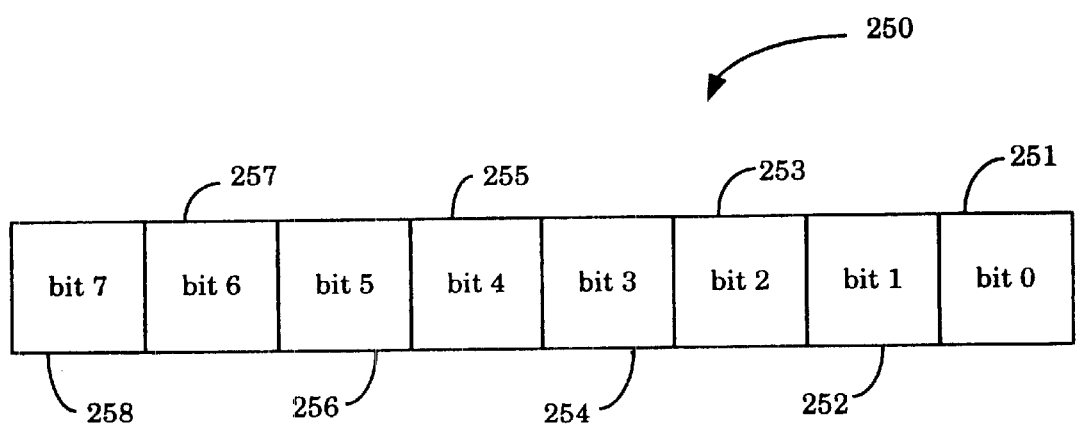
FIG. 5 is a block diagram of the bit representation of the read-write monitor byte.

In order for a software program, which in the preferred embodiment is a Unix™ driver, to send command data through the Video Buffer Card 74, the command data must be written to a particular memory address (e.g. 0X09000) from which it will be delivered to the display monitor. This address is called the monitor read-write address. As illustrated in FIG. 5, a lower byte associated to this memory location (hereinafter "monitor read-write byte") 250 is used to transmit and receive the command data. The memory controller and the video buffer controller cause data written into the monitor read-write byte 250 to be placed in the appropriate location in VRAM such that the monitor display interface will receive the data and transmit it to the display monitor over the monitor interface cable. Additionally, data received from the display monitor is read by one of CPUs from the same address base. If a second card is installed, as is possible in an alternative embodiment of the invention, the address is decoded through the memory controller 50 to support the two cards.

The monitor read-write byte 250 contains the command data, wherein only the four least significant bits (Bit0–Bit3) 251–254 are used while the four most significant bits (Bit7–Bit4) 255–258 are reserved for unrelated applications. The third bit ("Bit3") 254 of the monitor read-write byte 250 is a select bit used internally to indicate whether the display monitor of the system employs a microcontroller. In this configuration, if Bit3 254 is set to "logic 0" indicating that the display monitor has a properly configured microcontroller connectable to the video buffer card, Bit0–Bit2 251–253 of the monitor read-write byte 250 temporarily store and provide the voltage values of the MONRXD, MONTXD, and MONCLK signal. If Bit3 is set to "logic 1", a vertical Sync signal will be driven on the MONTXD line of the video buffer card to achieve compatibility with older type display monitors not configured with the internal microcontroller. This vertical Sync signal will be transmitted through a four step pipeline delay within the memory display interface to match the Csync signal output from the DAC as previously alluded to in reference to FIG. 3.

Each write to monitor read-write byte 250 will cause at most one bit of data to be written from the MONTXD line to the display monitor. Thus, it will require at least 16 writes to the monitor read-write address to transfer one byte of command data because two bits of clocked data are required to generate the logic "0" to logic "1" clock transition necessary to clock in one bit of command data. A byte word is transmitted least significant bit first. For example, in order to write a command byte represented by a hexadecimal bit representation "71H" to the display monitor, the proper sequence would be performed as shown in Table 1.

TABLE 1

| bit 7 | bit 6 | bit 5 | bit 4 | bit 3 | RXD bit 2 | TXD bit 1 | CLK bit 0 | READ-WRITE BYTE (in HEX) | |
|---|---|---|---|---|---|---|---|---|---|
| 0 | 0 | 0 | 0 | 0 | 0 | 1 | 0 | 02 | 1 |
| 0 | 0 | 0 | 0 | 0 | 0 | 1 | 1 | 03 | |

TABLE 1-continued

| bit 7 | bit 6 | bit 5 | bit 4 | bit 3 | RXD bit 2 | TXD bit 1 | CLK bit 0 | READ-WRITE BYTE (in HEX) | |
|---|---|---|---|---|---|---|---|---|---|
| 0 | 0 | 0 | 0 | 0 | 0 | 0 | 0 | 00 | } 0 |
| 0 | 0 | 0 | 0 | 0 | 0 | 0 | 1 | 00 | |
| 0 | 0 | 0 | 0 | 0 | 0 | 0 | 0 | 00 | } 0 |
| 0 | 0 | 0 | 0 | 0 | 0 | 0 | 1 | 01 | |
| 0 | 0 | 0 | 0 | 0 | 0 | 0 | 0 | 00 | } 0 |
| 0 | 0 | 0 | 0 | 0 | 0 | 0 | 1 | 01 | |
| 0 | 0 | 0 | 0 | 0 | 0 | 1 | 0 | 02 | } 1 |
| 0 | 0 | 0 | 0 | 0 | 0 | 1 | 1 | 03 | |
| 0 | 0 | 0 | 0 | 0 | 0 | 1 | 0 | 02 | } 1 |
| 0 | 0 | 0 | 0 | 0 | 0 | 1 | 1 | 03 | |
| 0 | 0 | 0 | 0 | 0 | 0 | 1 | 0 | 02 | } 1 |
| 0 | 0 | 0 | 0 | 0 | 0 | 1 | 1 | 03 | |
| 0 | 0 | 0 | 0 | 0 | 0 | 0 | 0 | 00 | } 0 |
| 0 | 0 | 0 | 0 | 0 | 0 | 0 | 1 | 01 | |

In this sequence, each "low" to "high" transition in Bit0 of the monitor read-write byte) indicates detection of a positive edge of the MONCLK signal and thus, causes the value on Bit1 to be detected by the microcontroller employed in the display monitor. Therefore, the writing of a byte "02H" follow by a writing of a byte "03H" represents the clocking in of a logic level "1" from the computer system to the display monitor and writing of a byte "00H" follow by the writing of a byte "01H" represents the clocking in of a logic level "0". More than 16 writes, however, may be required in some embodiments of the invention if a slower clock speed is required for proper operation. The above example serves to only show the minimum number of writes required.

Figure 6:
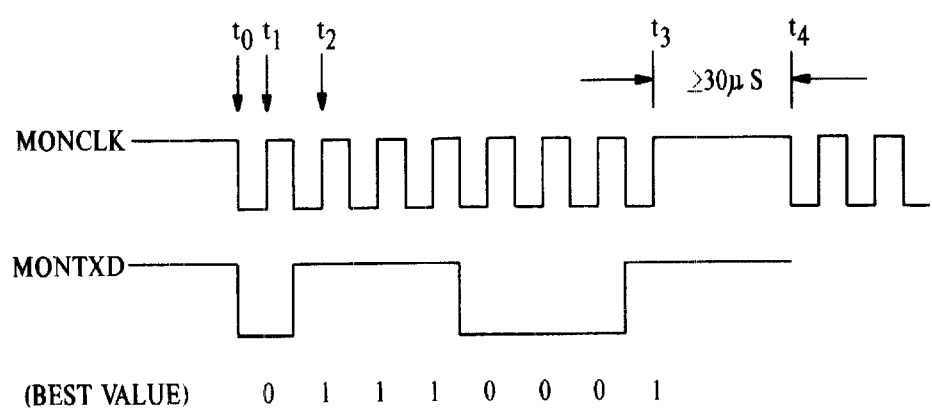
FIG. 6 is a timing diagram illustrating the signals used to transfer one byte of command data from the computer system to the display monitor.

FIG. 6 is a timing diagram illustrating the signal transitions associated with transfer of a single data byte from the computer system to the display monitor as shown in FIG. 5. The transmission of a single byte of data begins at time "$t_0$" with a negative edge on the MONCLK signal which results from a logic level "0" being written into Bit0 of the monitor read-write byte. At this same time, the MONTXD signal goes "low" as a result of a logic level "0" also being written into Bit1 of the monitor read-write byte. At time "$t_1$", the MONCLK signal goes "high" as a result of a logic level "1" being written to Bit0 of the monitor read-write byte (i.e., a positive edge of the MONCLK) which causes the logic level "0" on the MONTXD line to be clocked in as the first bit of the data byte. However, at time "$t_2$", a logic level "1" is written into the second bit of the data byte. At time "$t_3$", after eight bits have been clocked into the data byte, the MONCLK signal is held logic "high" for at least 30 μs. This is necessary for the display monitor to be able to process the data byte. The transmission of the next byte starts at time $t_4$. During operation, MONRXD and MONTXD signals are normally logic "high" when idle. Transmit and receive operations are completely independent, allowing for full duplex communication. Set up and hold times are 100 nanoseconds, exclusive of cable propagation delays.

Although it may appear that the interface described is closely related to the inter-integrated circuit serial bus ($I^2C$), the protocol disclosed for the present invention however, is a simplified version of this serial bus that reduces cost of implementation by taking advantage of the fact that an exclusive master slave relationship is required to achieve the goals of computer system control of the display monitor. Each byte of data are split into 2 nibbles being 4-bits each; namely, a most significant nibble and a least significant nibble. Thus, all monitor internal register values are internally scaled to reside between the hexadecimal ranges of "00H" and "FFH".

In the protocol used in the described embodiment of the invention, a command or instruction comprises a number of bytes of data consecutively sent to the display monitor as described above. These data bytes may include, but are not limited to (i) a packet header, (ii) a message header, (iii) a category code, (iv) a command category, (v) a command code and (vi) a terminator. As indicated above, the command begins with the transmission of a first byte representing the packet header. The packet header indicates the propagation path of communication information. For example, the packet header may store a unique hexadecimal value designating a computer system-to-display monitor communications path or another unique hexadecimal value designating a display monitor-to-computer system reply.

The next byte transmitted is the message header which indicates the type of information transmitted through the monitor interface cable. It is contemplated that various information types may include, but are not limited to command, inquiry, acknowledgment and error. The third byte of the command is the category code which specifies the type of device to which the command is being transmitted. For example, a display monitor may be defined by a unique hexadecimal bit representation while other unique bit representations may be associated with other devices.

The fourth byte is the command category which defines the broad category of commands under which the specific instructions fall. Examples include user controls, decrement, switch control codes, etc. The fifth byte is a command code which specifies the particular instruction which is to be executed in order to perform a given command such as, for example, a common geometric adjustment. It is contemplated that additional bytes may be included in combination with the command code; namely, (i) subcodes that offer finer division of command codes such as pin cushion adjustment, contrast change, etc. or (ii) additional data bytes depending on the particular type of command. Finally, the command is terminated by the terminator being a unique hexadecimal bit representation.

Figure 7:
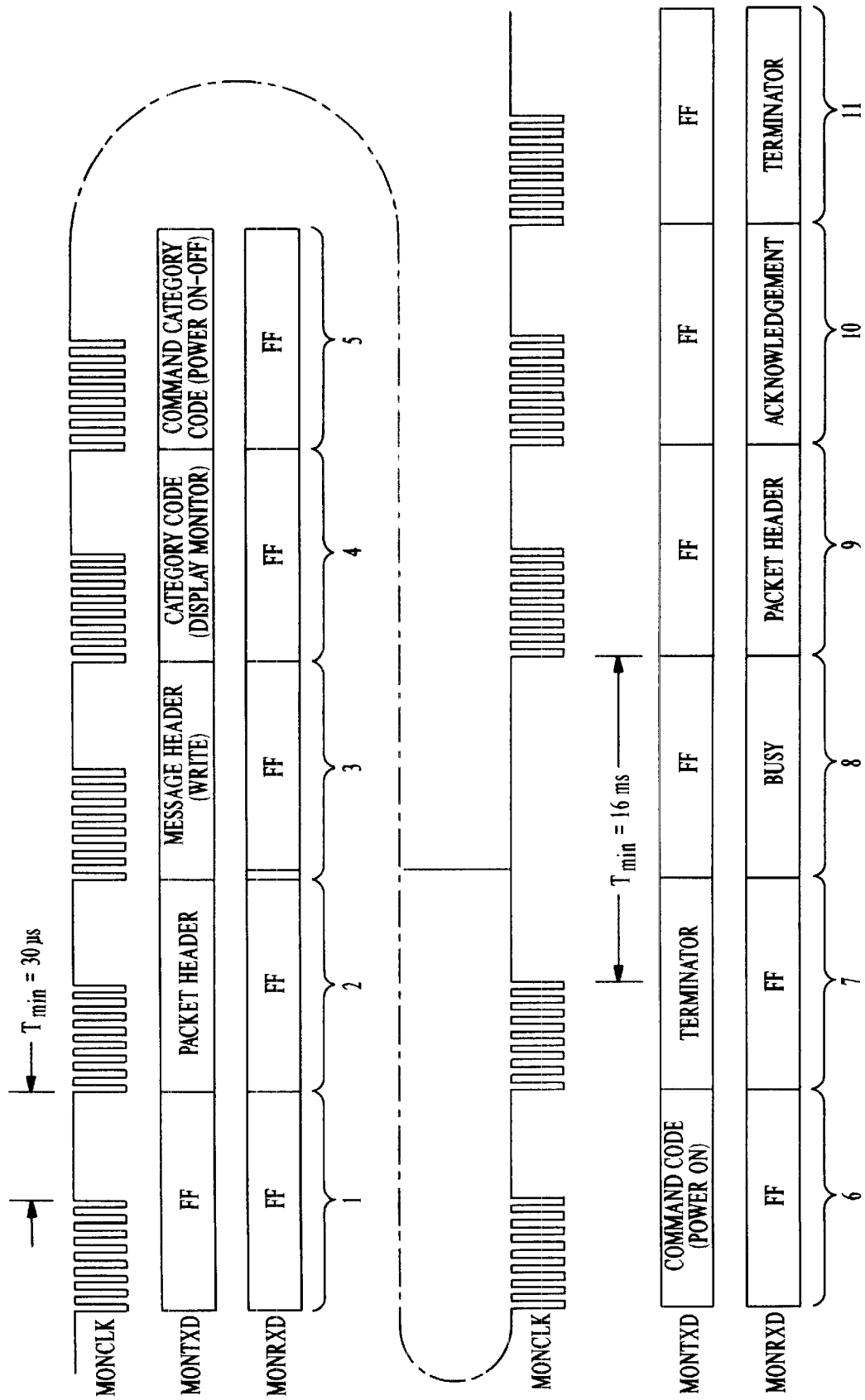
FIG. 7 is a timing diagram illustrating the timing associated with the transmission of a set of command bytes associated with a single command from the computer system to the display monitor.

As previously indicated above, the following are two examples of command interaction between a display monitor and computer system coupled through the monitor display cable. Referring to FIG. 7, a timing diagram is shown illustrating the bytes forming a command being transmitted from the computer system to the display monitor such as, for example, a power-on command. It is contemplated that each type of command is represented by a unique hexadecimal number as well as the bytes forming the command. During byte 1, when no information is being transmitted, both the display monitor and the computer system apply a logic level "1" to the MONTXD and MONTXD lines respectively, which in turn causes a "FFH" to be read. The display monitor will return "FFH" while idle and any selected hexadecimal representation if the display monitor is not ready (i.e., Busy) to return data after a command has been received.

The command begins with the transmission of the packet header at byte 2 from the computer system indicating that a command being transmitted from the computer system to the display monitor. At byte 3, the computer system transmits the message header indicating, for example, that a write command will be initiated typically in order to modify an internal state of the display monitor. At byte 4, the computer system transmits the category code indicating that the command is being transmitted to the display monitor. At byte 5, computer system transmits the command category which indicates that the command is a power on-off command as selected. At byte 6, the command code is transmitting indicating the selected instruction such as a power turn-on. At byte 7, the terminator being represented, for example as a "FFH", is transmitted indicating the termination of the command.

After the command has been issued, the display monitor requires a predetermined time to respond which in this embodiment is 16 milliseconds. During this time, no MONCLK signal should be provided and display monitor transmits a hexadecimal value indicating it is busy as shown in byte 8. Thereafter, the display monitor may transmit a command acknowledging receipt of the power turn-on command through (i) a packet header, (ii) a message header as an acknowledgment and (iii) a terminator. As shown in FIG. 7, at byte 9, the display monitor transmits the packet header indicating the start of the command from the display monitor to the computer system. At byte 10, the display monitor transmits the acknowledgment indicting that the command data from the computer system has been received and performed successfully. At byte 11, the display device transmits a "FFH" indicating the end of the acknowledgment.

Figure 8:
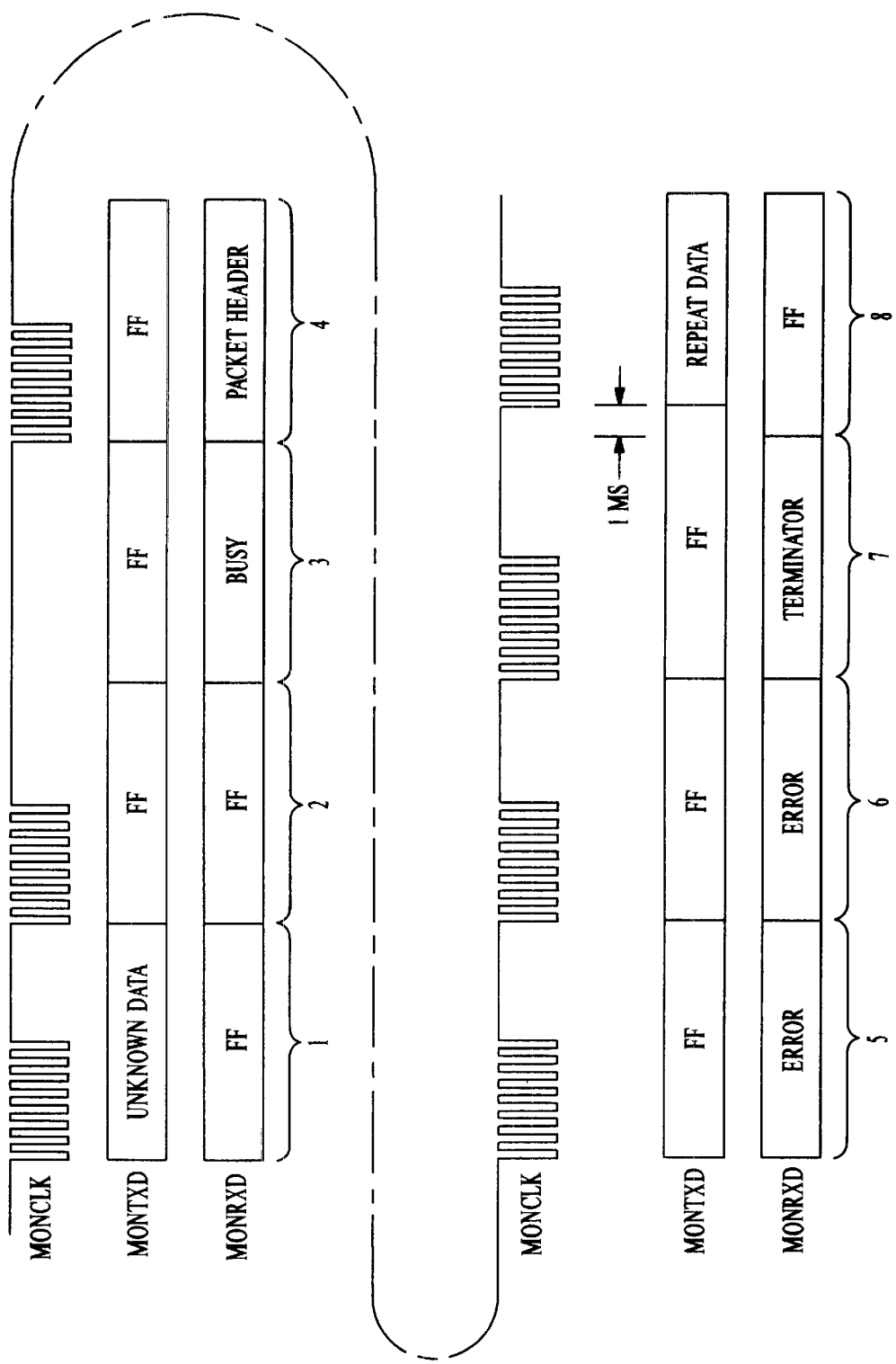
FIG. 8 is a timing diagram illustrating the timing associated with the transmission of a faulty command from the computer system to the display monitor.

Referring now to FIG. 8, a timing diagram illustrating the bytes associated with a failed transaction is shown. At byte 1, unknown data is transmitted from computer system to display monitor. At byte 4, the display monitor responds with a packet header to indicate commencement of a display monitor reply. Thereafter, at bytes 5–6, the display monitor transmits a message header indicating an error and a command code indicating a particular error instruction via MONRXD lines thereby indicating that the previous transfer was not a valid transaction for that display monitor. During byte 7, the display monitor transfers the terminator "FFH" wherein, after waiting at least one millisecond to allow the display monitor to clear its error flag and re-initialize the serial interface, the computer system can begin re-transmission of the data.

Thus, a method and apparatus for transmitting and receiving both command and display information between computer system and display monitor using a single cable has been described. To one skilled in the art, alternative embodiments of the invention will be apparent. The example provided is merely for illustrative purposes and should not be taken as limiting the scope of the invention.

What is claimed is:

1. A monitor interface cable comprising:
   a plurality of display signal lines to enable transfer of display data; and
   a plurality of command signal lines to enable transfer of command data, wherein the plurality of display signal lines and command signal lines enable the monitor interface cable to simultaneously transmit display data and command data between a display monitor and a computer system to concurrently display an image and to alter parameters of the image.

2. The monitor interface cable as set forth in claim 1, wherein the monitor interface cable is terminated with a first connector and a second connector, each of the first and second connectors including at least three coaxial contacts to couple the plurality of display signal lines therebetween and at least three line contacts to couple said plurality of command signal lines therebetween.

3. The monitor interface cable as set forth in claim 2, wherein the plurality of command signal lines includes:
   a monitor transmission line MONTXD to enable transmission of the command data from the computer system to the display monitor operating as a slave device;
   a monitor clocking line MONCLK to provide a master clocking signal of the command data; and
   a monitor receive line MONRXD to enable transmission of the command data as status information from the display monitor to the computer system.

4. The monitor interface cable as set forth in claim 3, wherein the monitor transmission line and the monitor receive line support serial transmission of the command data.

5. The monitor interface cable as set forth in claim 4, wherein the plurality of video display signal lines transmits a combined synchronization signal having vertical and horizontal synchronization data and at least one signal for providing intensity data for a particular color synchronized with the combined synchronization signal.

6. The monitor interface cable as set forth in claim 5, wherein the at least one signal transmitted through the plurality of display signal lines comprises:
   a first signal to provide intensity data for a first color synchronized with the combined synchronization signal;
   a second signal to provide intensity data for a second color synchronized with the combined synchronization signal; and
   a third signal to provide intensity data for a third color synchronized with the combined synchronization signal.

7. The system as set forth in claim 6, wherein the command data comprises:
   a first byte for indicating a propagation path of the command data;
   a second byte for indicating a type of the command data, the type being one of a group consisting of a command, an acknowledgment or an error; and
   a third byte for indicating termination of the command data.

8. Adaptable to a display monitor, a monitor interface cable comprising:
   a monitor transmission line configured to provide command data for adjusting characteristics of the display monitor; and
   a monitor clocking line configured to provide a clock signal to synchronize serial transmissions of at least said command data.

9. The monitor interface cable of claim 8 further comprising:
   a monitor transmission line configured to provide status information.

10. The monitor interface cable of claim 9 further comprising:
    a plurality of display signal lines.

11. The monitor interface cable of claim 9 further comprising:
    a line configured to provide a combined horizontal and vertical synchronization signal.

12. A video connector comprising:
    a plurality of contracts designated for coaxial connectors;
    a first contact to provide command data in a serial manner;
    a second contact to receive serial data; and
    a control contact to provide a clock signal to synchronize the serial data with the command data.

* * * * *